US012566190B2

(12) United States Patent
Tomita

(10) Patent No.: US 12,566,190 B2
(45) Date of Patent: Mar. 3, 2026

(54) ROTARY SPEED SENSOR

(71) Applicant: Proterial, Ltd., Tokyo (JP)

(72) Inventor: Kazuhiko Tomita, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 160 days.

(21) Appl. No.: 18/627,915

(22) Filed: Apr. 5, 2024

(65) Prior Publication Data

US 2024/0337675 A1      Oct. 10, 2024

(30) Foreign Application Priority Data

Apr. 10, 2023      (JP) ................................. 2023-063559

(51) Int. Cl.
  *G01P 3/44*          (2006.01)
  *G01D 5/14*          (2006.01)
(52) U.S. Cl.
  CPC ................ *G01P 3/44* (2013.01); *G01D 5/147* (2013.01)
(58) Field of Classification Search
  CPC ........... G01D 5/145; G01D 5/147; G01P 3/44
  See application file for complete search history.

(56) References Cited

U.S. PATENT DOCUMENTS

| | | | | | |
|---|---|---|---|---|---|
| 5,115,194 | A | * | 5/1992 | Luetzow | H03K 17/9517 |
| | | | | | 324/207.2 |
| 5,264,792 | A | * | 11/1993 | Luetzow | G01B 7/023 |
| | | | | | 324/207.2 |
| 5,321,355 | A | * | 6/1994 | Luetzow | H03K 17/9517 |
| | | | | | 324/207.2 |
| 5,581,179 | A | * | 12/1996 | Engel | G01D 5/147 |
| | | | | | 174/559 |
| 5,637,995 | A | * | 6/1997 | Izawa | G01P 3/488 |
| | | | | | 324/207.21 |
| 5,814,985 | A | * | 9/1998 | Oudet | H10N 52/101 |
| | | | | | 324/207.2 |
| 6,278,269 | B1 | * | 8/2001 | Vig | G01B 7/001 |
| | | | | | 324/207.2 |
| 2021/0080480 | A1 | | 3/2021 | Tomita et al. | |

FOREIGN PATENT DOCUMENTS

JP          2021043139 A          3/2021

* cited by examiner

*Primary Examiner* — Walter L Lindsay, Jr.
*Assistant Examiner* — Milton Gonzalez
(74) *Attorney, Agent, or Firm* — McCormick, Paulding & Huber PLLC

(57)          ABSTRACT

A rotary speed sensor according to an embodiment includes: a sensor component including magnetic detection elements; a magnet on a bottom surface side of the sensor component; and a magnetic panel arranged between the bottom surface of the sensor component and the magnet and made of a magnetic material. An opening penetrating in a first direction that is an arrangement direction of the sensor component, the magnetic panel and the magnet is formed in the magnetic panel. A wall surface of the opening includes: an inner wall having a constant diameter; and an edge being closer to the sensor component than the inner wall and having a variable diameter. The farther from the bottom surface in the first direction a part of the edge is, the closer to a center of the opening the part is.

3 Claims, 8 Drawing Sheets

RSS1

RSS1

RSS1

RSS1

DEGREE OF OUTPUT VARIATION
(DUTY RATIO)

ROTARY SPEED SENSOR

CROSS-REFERENCE TO RELATED APPLICATION

The present application claims priority to Japanese Patent Application No. 2023-63559 filed on Apr. 10, 2023, the disclosure of which is incorporated herein by reference.

TECHNICAL FIELD OF THE INVENTION

The present invention relates to a rotary speed sensor.

BACKGROUND OF THE INVENTION

A rotary speed sensor is mounted on, for example, a vehicle in order to detect a rotary speed of a wheel. The rotary speed sensor mounted on the vehicle for such a purpose is generally called "wheel speed sensor". The rotary speed sensor functioning as the wheel speed sensor is mounted on the vehicle, as one of constituent elements of an anti-lock brake system (ABS system) for preventing (operation) block of the vehicle, a traction control system for preventing slip of the wheel and others.

Japanese Patent Application Laid-open Publication No. 2021-43139 (Patent Document 1) describes a rotary speed sensor for detecting change of a magnetic field caused by rotation of a gear that rotates together with a wheel. In this rotary speed sensor, a magnetic detection element is used to detect the change of the magnetic field caused by the rotation of the gear or others that is a measured object.

SUMMARY OF THE INVENTION

In the case of the rotary speed sensor using the magnetic detection element, a magnetic flux density detected by the magnetic detection element of the rotary speed sensor is increased by reducing a distance (that is called air gap) between the measured object and the rotary speed sensor. As a result, measuring accuracy of the rotary speed sensor can be improved. However, the large air gap is preferable in consideration of easiness of a work for attachment of the rotary speed sensor, a degree of freedom of design of the rotary speed sensor and others.

In the rotary speed sensor of the Patent Document 1, since a magnetic panel having an opening is arranged between the magnetic detection element and a magnet, the air gap is made large together with securement of the measuring accuracy of the rotary speed sensor. However, it is desirable to further enlarge the air gap in the state of the securement of the measuring accuracy of the rotary speed sensor.

A rotary speed sensor according to an embodiment includes: a sensor component including a first surface, a second surface opposite to the first surface, a first magnetic detection element arranged between the first surface and the second surface, and a second magnetic detection element arranged between the first surface and the second surface to separate from the first magnetic detection element; a magnet on the second surface side of the sensor component; and a magnetic panel arranged between the second surface of the sensor component and the magnet. An opening penetrating in a first direction that is an arrangement direction of the sensor component, the magnetic panel and the magnet is formed in the magnetic panel. A wall surface of the opening includes: an inner wall having a constant diameter; and an edge being closer to the sensor component than the inner wall and having a variable diameter. The farther from the second surface in the first direction a part of the edge of the opening is, the closer to a center of the opening the part is.

According to the present invention, a range of the air gap securing the detection accuracy of the rotary speed sensor can be enlarged.

BRIEF DESCRIPTIONS OF THE DRAWINGS

DESCRIPTIONS OF THE PREFERRED EMBODIMENTS

Embodiments of the present invention will be explained below with reference to drawings.

General Configuration

Figure 1:
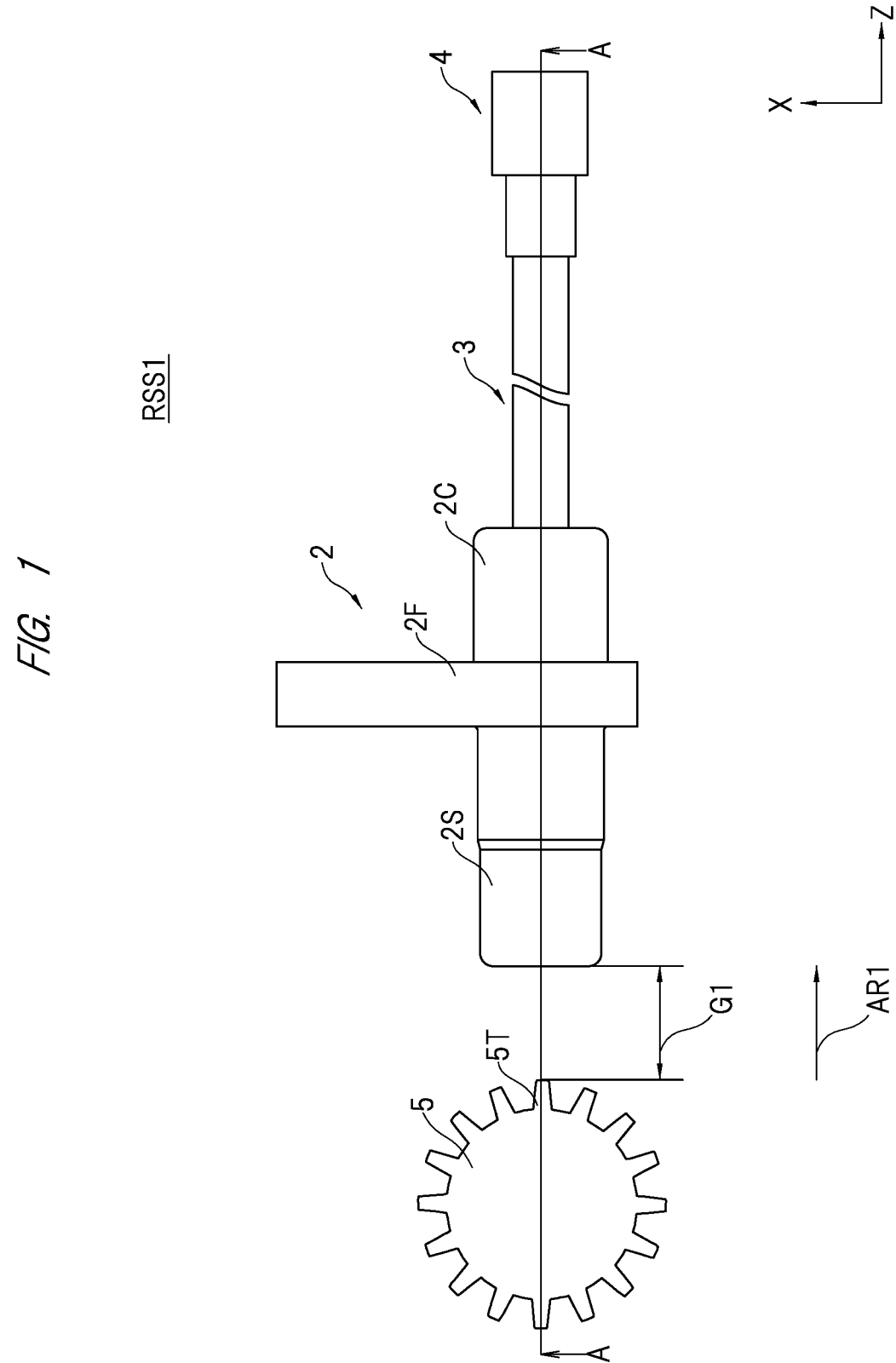
FIG. 1 is a diagram showing a configuration of a rotary speed sensor of an embodiment.
Figure 2:
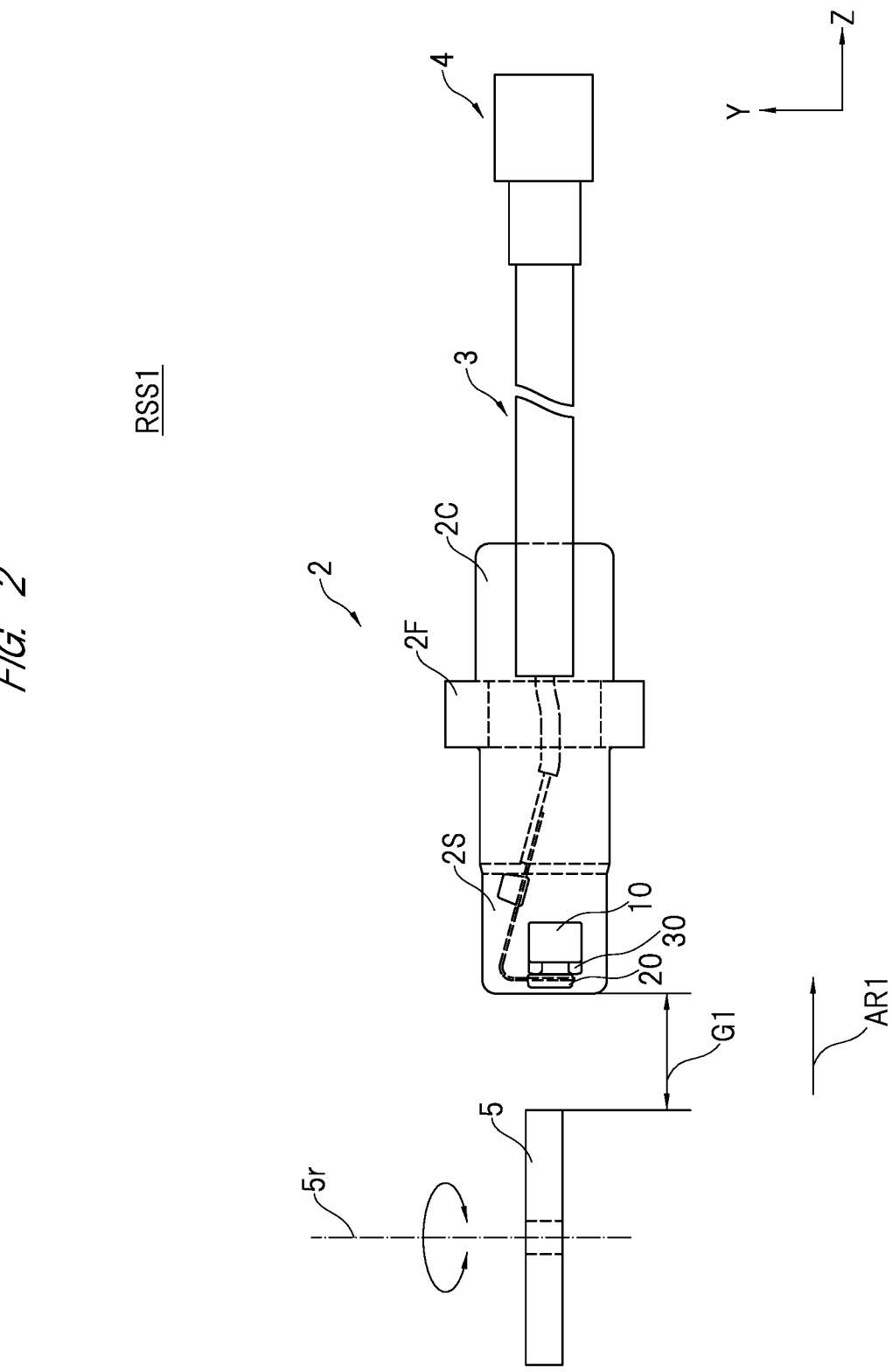
FIG. 2 is a cross-sectional view of the rotary speed sensor taken along a line A-A shown in FIG. 1.

FIG. 1 is a diagram schematically showing a configuration of a rotary speed sensor RSS1 of an embodiment. FIG. 2 is a cross-sectional view of the rotary speed sensor RSS1 taken along a line A-A of FIG. 1. The rotary speed sensor RSS1 of the present embodiment includes a sensor head 2, a cable 3 and a connector 4. The sensor head 2 is arranged near a gear 5 that rotates together with a wheel not illustrated. The sensor head 2 is fixed to a vehicle body (hub, knuckle, suspension and others) so that positional relation itself with the gear 5 is a predetermined positional relation. In the present embodiment, the sensor head 2 is fixed so that a sensor holding portion 2S of the sensor head 2 and an outer circumference (that is a portion where a plurality of teeth 5T are arranged) of the gear 5 face each other. The gear 5 is made of a magnetic body, and rotates around a rotational axis $5r$ in response to rotation of the wheel not illustrated.

<Sensor Head 2>

The sensor head 2 includes a flange portion 2F, the sensor holding portion 2S formed on one side of the flange portion 2F, and a cable holding portion 2C formed on the other side of the flange portion 2F. The flange portion 2F, the sensor holding portion 2S and the cable holding portion 2C are formed to be unified by a resin. Each of the flange portion 2F, the sensor holding portion 2S and the cable holding portion 2C is a part of an injection-molded resin composite.

A part of the magnet 10, the sensor component 20, the magnet panel 30 and the cable 3 is embedded inside the sensor head 2. By the rotation of the gear 5, a direction (vector) and distribution of the magnetic field travelling from the magnet 10 in the sensor head 2 toward the gear 5 are changed. The sensor component 20 is a magnetic sensor IC detecting the magnetic field travelling from the magnet 10 toward the gear 5 and outputting an electrical signal depending on a magnitude of this magnetic field. An "air gap G1" explained below is defined as the minimum distance between the rotary speed sensor RSS1 and the gear 5. In the present embodiment, a part of a housing of the sensor holding portion 2S interposes between the sensor component 20 embedded inside the sensor head 2 and the gear 5, and therefore, the air gap G1 is defined as the minimum distance between the housing of the sensor holding portion 2S and the gear 5.

Note that details of the magnet 10, the sensor component 20 and the magnet panel 30 will be explained later.

<Peripheral Structure of Sensor Component 20>

Figure 3:
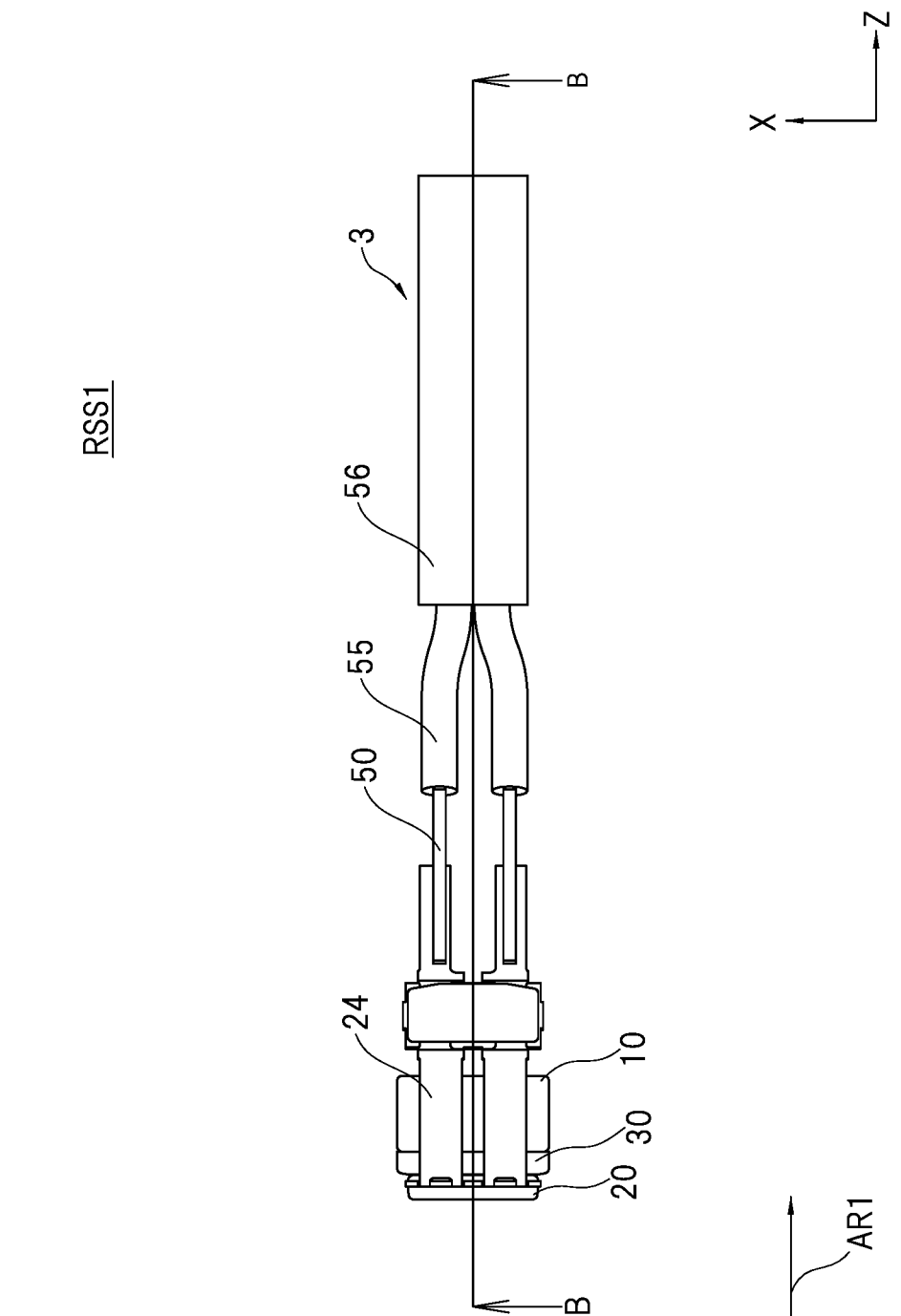
FIG. 3 is an appearance diagram of a magnet, a sensor component, a magnetic panel and a cable embedded in a sensor head.
Figure 4:
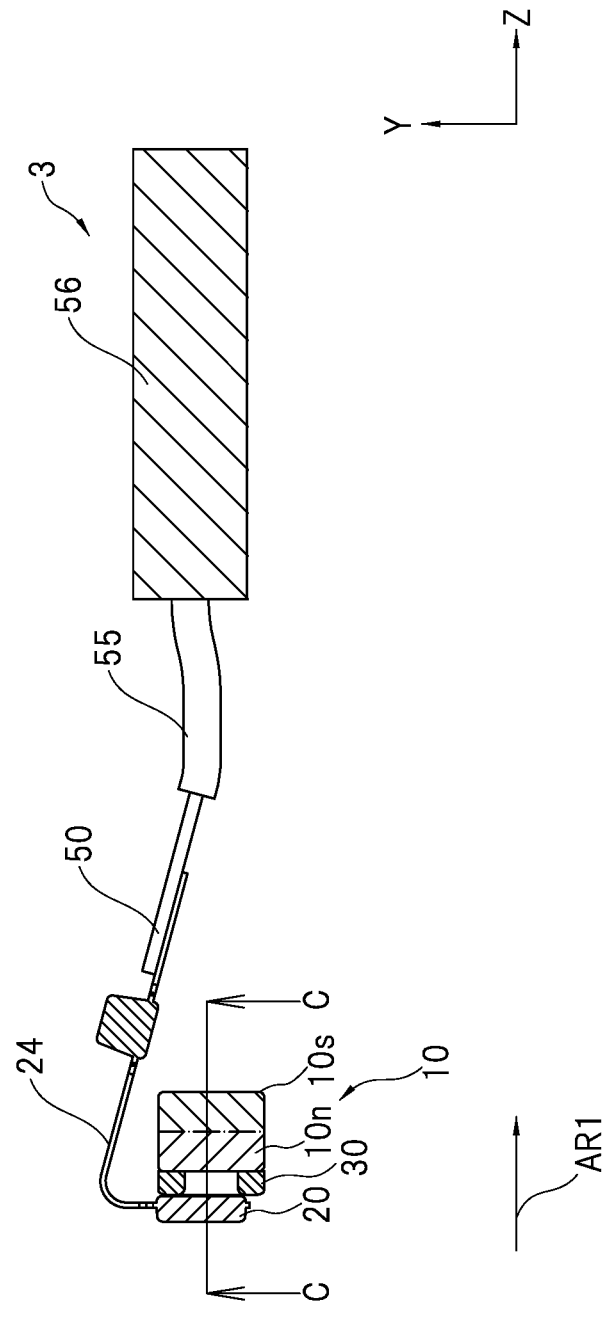
FIG. 4 is a cross-sectional view taken along a line B-B shown in FIG. 3.
Figure 5:
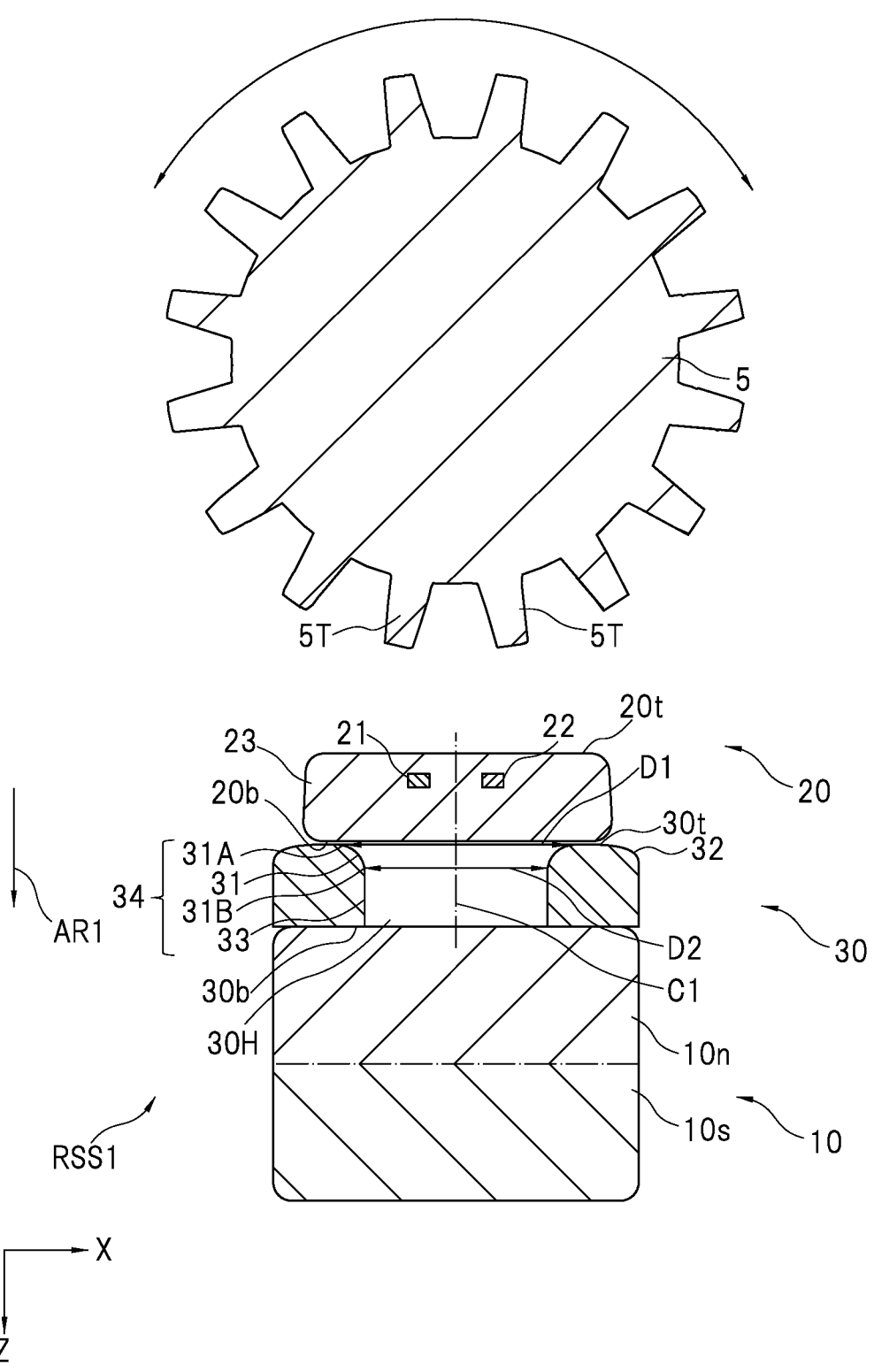
FIG. 5 is a cross-sectional view taken along a line C-C shown in FIG. 4.

FIG. 3 is an appearance diagram of the magnet 10, the sensor component 20, the magnetic panel 30 and the cable 3 embedded in the sensor head 2. FIG. 4 is a cross-sectional view taken along a line B-B shown in FIG. 3. FIG. 5 is a cross-sectional view taken along a line C-C shown in FIG. 4. Note that FIG. 5 shows the gear 5 in addition to the magnet 10, the sensor component 20 and the magnetic panel 30.

The magnet 10, the sensor component 20 and the magnetic panel 30 are fixed into the sensor holding portion 2S of the sensor head 2. In the present embodiment, the sensor component 20, the magnetic panel 30 and the magnet 10 are arranged in this order from a side close to the gear 5. In the following explanation, note that a direction of the arrangement of the sensor component 20, the magnetic panel 30 and the magnet 10 may be referred to as first direction AR1. In FIGS. 1 to 5, a proximal end in the first direction AR1 illustrated with an arrow may be referred to upper side, and a distal end therein may be referred to lower side. Also, the explanation may be made with reference to an orthogonal coordinate system in which the first direction AR1 is regarded as a Z direction, a direction orthogonal to the Z direction and along the rotational axis 5r of the gear 5 shown in FIG. 2 is regarded as a Y direction, and a direction orthogonal to the Y and Z directions is regarded as an X direction.

<Cable 3>

The sensor head 2 and the connector 4 are connected to each other through the cable 3. The cable 3 is a multicore cable including a plurality of core wires 50. More specifically, the cable 3 is a multicore cable including: a core wire 50 connected to a magnetic detection element 21 arranged in the sensor component 20 described in detail later through a lead wire 24; and another core wire 50 connected to the magnetic detection element 21 through another lead wire 24.

Each of the core wires 50 is covered with an insulator 55. Further, the core wires 50 each covered with the insulator 55 are collectively covered with a sheath 56 while being twisted with one another. In other words, the cable 3 is a double-core cable including two twisted insulated electrical wires and the sheath 56 collectively covering the two insulated electrical wires to be one wire.

Note that the core wire 50 of the present embodiment is a strand wire made of a plurality of copper alloy wires containing tin. The insulator 55 is made of cross-linked polyethylene, and the sheath 56 is made of thermoplastic urethane. Nevertheless, the materials of the core wire 50, the insulator 55 and the sheath 56 are of course not limited to the above-described materials.

The electrical signal output from the sensor component 20 embedded inside the sensor head 2 is transmitted to the connector 4 through the cable 3, and is input to a connection source of the connector 4. The connector 4 is connected to, for example, a controller or a control apparatus of an ABS system, a controller or a control apparatus for centrally controlling various systems including the ABS system or others.

<Magnet 10>

The magnet 10 has a magnetic pole $10n$ magnetized with a N pole and a magnetic pole $10s$ magnetized with a S pole. The magnet 10 is arranged on a lower side of the sensor component 20, in other words, on a lower surface $20b$ side of the sensor component 20. In a case of single magnet having the N pole and the S pole as described in the magnet 10, a plurality of magnetic flux lines travelling from the N pole to the S pole are formed around the magnet 10.

<Sensor Component 20>

The sensor component 20 includes: a sealing body 23 having an upper surface (top surface) $20t$ facing the gear 5 and a lower surface (bottom surface) $20b$ opposite to the top surface $20t$; a magnetic detection element (first magnetic detection element) 21; and a magnetic detection element (second magnetic detection element) 22. The magnetic detection elements 21 and 22 are arranged between the top surface $20t$ that is a first surface and the bottom surface $20b$ that is a second surface. In other words, the magnetic detection elements 21 and 22 are sealed inside the sealing body 23. The magnetic detection elements 21 and 22 separate from each other. Inside the sealing body 23, the magnetic detection elements 21 and 22 are electrically connected to the lead wire 24. A part of each of a plurality of the lead wires 24 is sealed inside the sealing body 23, and the other part thereof extends to outside of the sealing body 23.

As the magnetic detection elements 21 and 22, a Hall element measuring a magnetic flux density by using the Hall effect or a Magneto Resistive effect element (MR element) measuring a magnitude of a magnetic field (magnetic flux or magnetic flux density) by using the magneto resistive effect can be used. Each of the magnetic detection elements 21 and 22 of the present embodiment is a Giant Magneto Resistive effect element (GMR element). Note that each of the magnetic detection elements 21 and 22 may be an Anisotropic Magneto Resistive effect element (AMR element) or a Tunnel Magneto Resistive effect element (TMR element). The magnetic detection elements 21 and 22 are arranged along the X direction.

In the case of the rotary speed sensor RSS1 including the sensor component 20 arranged between the magnet 10 and the gear 5 as described in the present embodiment, magnetic force is applied from the back surface side (bottom surface $20b$ side) of the sensor component 20. Such a magnetic-force applying system is called back bias system. As another example of the rotary speed sensor RSS1, a system in which the rotary body itself is provided with the magnet is exemplified. For example, the N pole and the S pole are alternatively arranged on an outer circumference of a magnet encoder, and the sensor component is arranged at a position facing the magnet encoder. In this case, by rotation of the magnet encoder caused by rotation of the wheel, the positions of the magnetic poles of the magnet encoder are changed, and therefore, the magnetic field around the sensor component is changed.

The sensor component 20 including the magnetic detection elements 21 and 22 detects the magnetic field in a horizontal direction (that is a direction including an X-Y plane including the X direction and the Y direction). The magnetic detection elements 21 and 22 exert an electrical resistance depending on a magnitude of the detected magnetic field. Therefore, by the change of the magnetic field around the magnetic detection elements 21 and 22, a resistance value exerted by each of the magnetic detection elements 21 and 22 is changed. A signal that is output depending on the change of the resistance value of each of the magnetic detection elements 21 and 22 is output to outside of the sensor component 20 through the lead wire 24. As described above, the signal output from the magnetic detection elements 21 and 22 is transmitted to the connector 4 through the cable 3 including the lead wire 24, and is input to the connection source of the connector 4.

In the case of the back bias system of the present embodiment, a speed and a rotational direction of the rotary body are detected based on change in a degree of how much the magnetic flux line extending from the magnet 10 toward the gear 5 penetrates through the magnetic detection elements 21 and 22 arranged between the magnet 10 and the gear 5. In this case, improvement of the magnetic detection accuracy of the sensor component 20 tends to reduce the air gap G1. When the air gap G1 that is a clearance between the gear 5 and the sensor holding portion 2S is small, it is necessary to fix the sensor head 2 to be near the gear 5. This case causes complexity in the work for the attachment of the sensor head 2 itself or a component fixed near the sensor head 2. In consideration of the degree of freedom of design of the sensor component 20, the larger air gap G1 is preferable. A necessary value of the air gap G1 is set in consideration of variation in a dimension, an amplitude of vibration or others.

<Magnetic Panel 30>

The magnetic panel 30 is made of, for example, a magnetic material such as a metal material. In the present embodiment, the magnetic panel 30 is made of a stainless steel (SUS430). The magnetic panel 30 is arranged between the magnet 10 and the gear 5, more specifically between magnet 10 and the sensor component 20. The magnetic panel 30 is a plate-shaped member having a top surface 30t facing the bottom surface 20b of the sensor component 20 and a bottom surface 30b opposite to the top surface 30t and facing the magnet 10. The magnetic panel 30 includes an opening 30H penetrating the top surface 30t and the bottom surface 30b in the first direction AR1. The opening 30H is formed into, for example, a circular shape centering a center axis C1 extending in the first direction AR1 on the X-Y plane. The magnetic panel 30 and the opening 30H are formed so that the plate-shaped material member is pressmolded.

When a magnetic body is arranged near a permanent magnet, a magnetic flux line extending from an N pole of the permanent magnet extends toward the magnetic body, and penetrates the magnetic body. As described above, the plurality of magnetic flux lines extending from the N pole to the S pole of the magnet 10 are formed around the magnet 10. Therefore, since the magnetic panel 30 is arranged between the sensor component 20 and the magnet 10, the magnetic flux density of the magnetic field travelling from the magnetic pole portion 10n of the magnet 10 toward the sensor component 20 can be increased.

When being viewed in the Z direction (first direction AR1) that is the arrangement direction of the sensor component 20, the magnetic panel 30 and the magnet 10, the opening 30H is formed at a position overlapping a line segment connecting center of the magnetic detection element 21 and center of the magnetic detection element 22. In this manner, the direction of the magnetic field inside the opening 30H is more difficult to be corrected to the Z direction than the case of the magnetic panel 30 without the opening 30H formed therein. In other words, in the opening 30H, an X-directional component of the magnetic field crossing the Z direction is increased by the rotation of the gear 5. The increase of the X-directional component of the magnetic field near the magnetic detection elements 21 and 22 can increase the magnetic flux density of the magnetic field penetrating the magnetic detection elements 21 and 22.

As described above, the magnetic panel 30 and the opening 30H are formed by the press molding of the material member. Therefore, shear droop is formed on an outer edge of either one of the top surface 30t and the bottom surface 30b of the magnetic panel 30, and burr is formed on an outer edge of the other surface. Similarly, shear droop is formed on an edge of either one of the top surface 30t and the bottom surface 30b of the opening 30H, and burr is formed on an edge of the other surface. In the present embodiment, the magnetic panel 30 is arranged in a state in which surfaces having the shear droop formed thereon in the outer edge of the magnetic panel 30 and the edge of the opening 30H face the bottom surface 20b of the sensor component 20 while surfaces having the burr formed thereon in the outer edge of the magnetic panel 30 and the edge of the opening 30H face the magnet 10. In other words, the shear droop is formed on the outer edge 32 of the top surface 30t of the magnetic panel 30 and the edge 31 of the opening 30H, and the burr is formed on the outer edge of the bottom surface 30b of the magnetic panel 30 and the edge of the opening 30H.

Since the above-described shear droop is formed on the edge 31 of the opening 30H in the top surface 30t, its cross-sectional surface of a plane in parallel to the Z direction is an R-shaped surface. Specifically, a wall surface 34 of the opening 30H has the edge 31 having a variable diameter and an inner wall 33 having a constant diameter. The edge 31 is connected to the inner wall 33, and is closer to the sensor component 20 (upper side) than the inner wall 33. The edge 31 is a joint surface between an end portion 31A of the opening 30H and a connection portion 31B of the opening 30H. The end portion 31A is an opening end of the opening 30H in the top surface 30t facing the sensor component 20. At the connection portion 31B, the edge 31 and the inner wall 33 are connected to each other.

The edge 31 has a shape in which the farther from the bottom surface 20b of the sensor component 20 in the first direction AR1 a part of the edge 31 is, the closer to the center axis C1 that is the center of the opening 30H the part is. More specifically, a diameter D1 of the end portion 31A is larger than a diameter D2 of the connection portion 31B.

Since the above-described shear droop is also formed on the outer edge 32 in the top surface 30t, its cross-sectional surface of a plane in parallel to the Z direction is an R-shaped surface. Specifically, the outer edge 32 has a shape in which the farther from the bottom surface 20b of the sensor component 20 in the first direction AR1 a part of the outer edge 32 is, the farther from the center of the opening 30H the part is.

Figure 6:
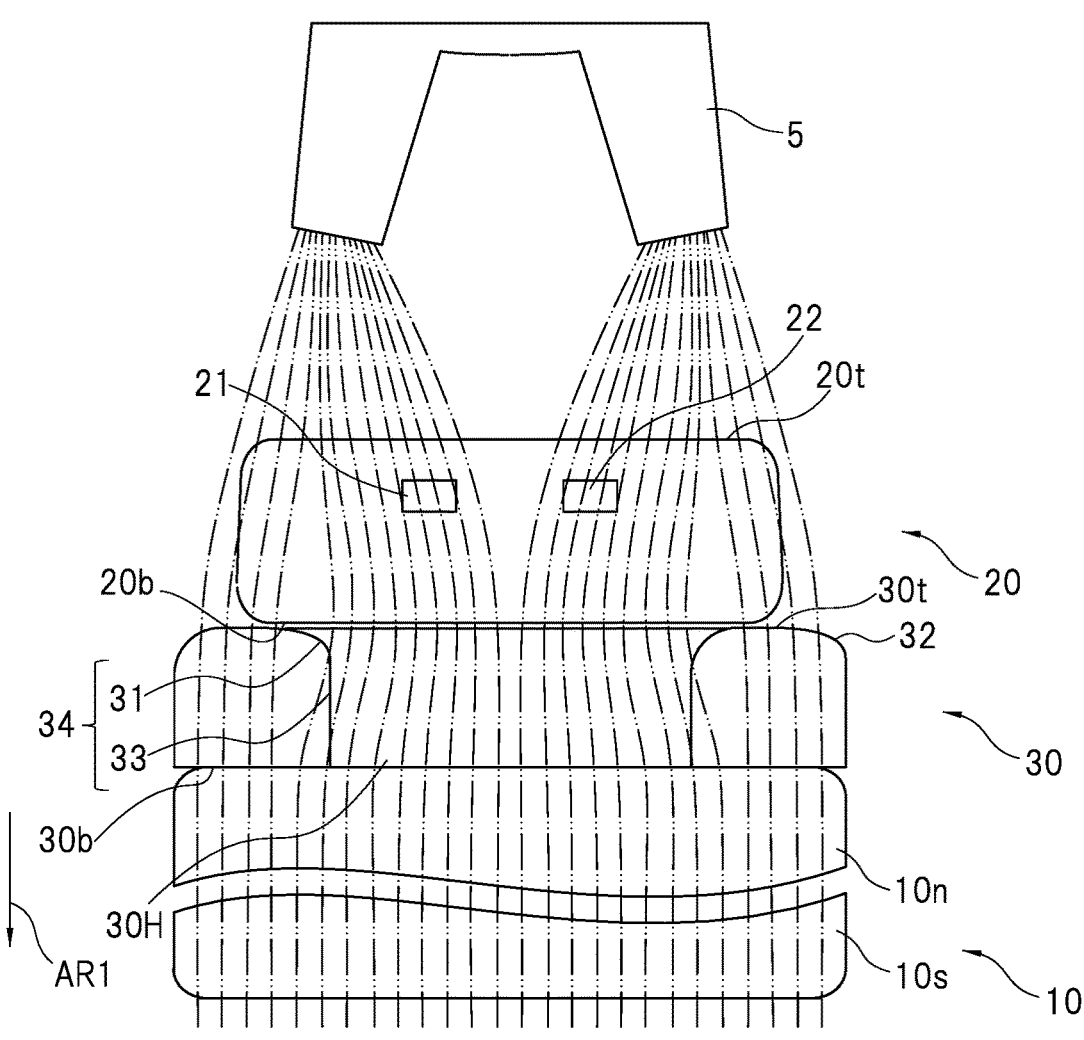
FIG. 6 is a diagram schematically showing magnetic flux lines formed around the sensor component shown in FIG. 5.
Figure 6:
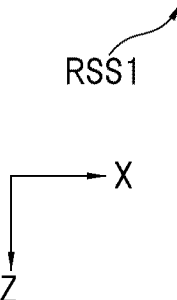

FIG. 6 is a diagram schematically showing the magnetic flux lines penetrating the sensor component 20 from the magnet 10 through the magnetic panel 30. In FIG. 6, the magnetic flux lines are illustrated with dashed double-dotted lines. Some of the plurality of magnetic flux lines extend from an inner side surface of the magnetic panel 30 to the opening 30H. Since each of the edge 31 and the outer edge 32 has the R-shaped cross-sectional surface on the plane in parallel to the Z direction, some of the magnetic flux lines extend toward the magnetic detection elements 21 and 22 through this R-shaped cross-sectional surface. In this case, the magnetic flux density near the magnetic detection elements 21 and 22 can be increased by adjustment of positional relation between the opening 30H and the magnetic detection elements 21 and 22. As a result, even without the reduction in the air gap G1, the detection accuracy of the magnetic detection elements 21 and 22 can be improved. In other words, the range of the air gap G1 can be expanded together with the securement of the detection accuracy of the magnetic detection elements 21 and 22.

Figure 7:
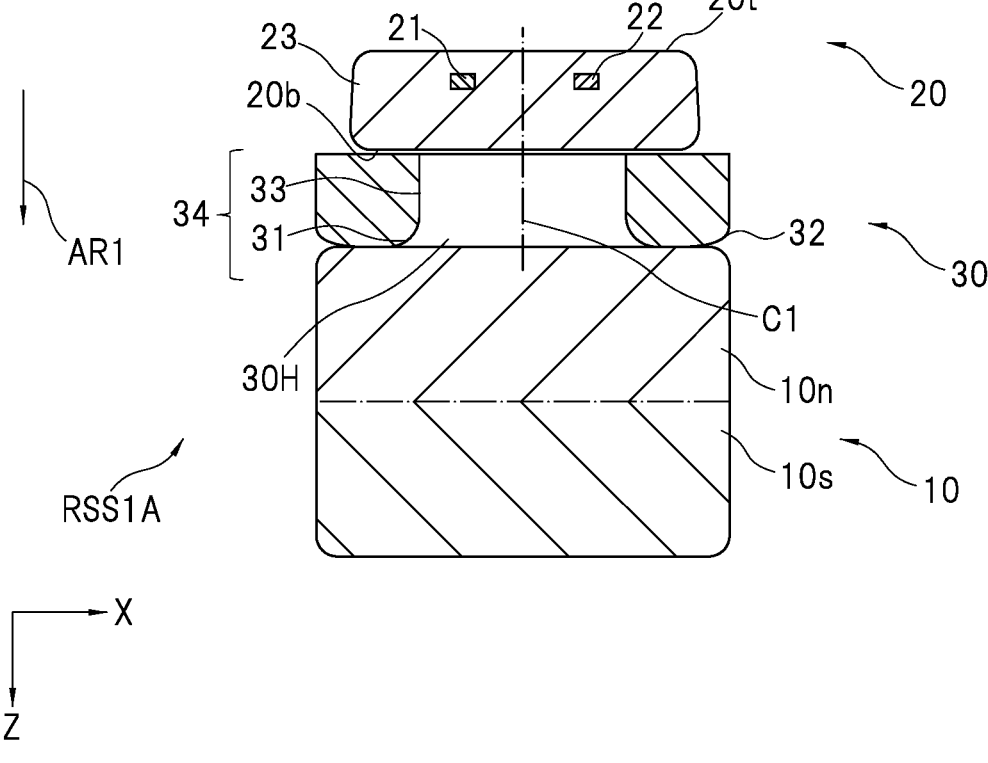
FIG. 7 is a cross-sectional view of a rotary speed sensor of a comparative example.

FIG. 7 is a cross-sectional view of each of the magnet 10, the sensor component 20 and the magnet panel 30 in a rotary speed sensor RSS1A of a comparative example. In this comparative example, the surfaces having the shear droop formed thereon in the edge 31 and the outer edge 32 of the magnetic panel 30 face the magnet 10, and the surfaces having the burr formed thereon in the edge and the outer edge of the magnetic panel 30 face the sensor component 20. In other words, the magnet panel 30 is arranged in a state in which the top surface 30t and the bottom surface 30b of the magnetic panel 30 in the above-described embodiment are flipped. Other configurations are the same as those of the rotary speed sensor RSS1 of the above-described embodiment.

Figure 8:
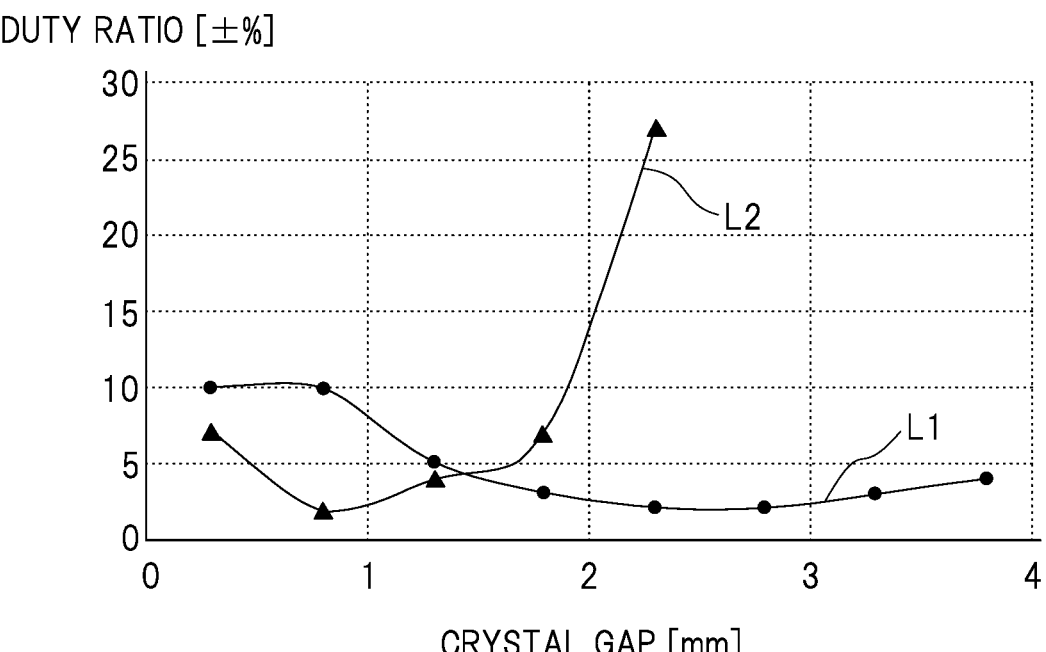
FIG. 8 is a diagram showing detection accuracies of the rotary speed sensor of the embodiment and the rotary speed sensor of the comparative example.

FIG. 8 is a diagram showing an example of measurement results of the detection accuracy of the rotary speed sensor RSS1 of the above-described embodiment and the rotary speed sensor RSS1A of the comparative example. FIG. 8 shows a degree of variation (Duty ratio) of outputs of the rotary speed sensors RSS1 and RSS1A observed for each change of the distance (crystal gap) between the gar 5 and the upper surfaces of the magnetic detection elements 21 and 22. A graph L1 shown in FIG. 8 shows the variation degree of the output of the rotary speed sensor RSS1 of the above-described embodiment, and a graph L2 shows the variation degree of the output of the rotary speed sensor RSS1A of the comparative example. In FIG. 8, a vertical axis shows a value ([+%]) of the Duty ratio, and a horizontal axis shows a value ([mm]) of the crystal gap. In the measurement, note that the gear 5 having 48 teeth 5T is used. A state providing the outputs from the rotary speed sensors RSS1 and RSS1A means a state providing waveforms (pulse waveforms) corresponding to the respective 48 teeth 5T of the gear 5, in other words, 48 waveforms.

As shown in FIG. 8, the Duty ratio of the rotary speed sensor RSS1A of the comparative example ranges from ±2% to ±27%. And, when the crystal gap is larger than 2.3 mm, the output of the rotary speed sensor RSS1A is not provided. In other words, the number of the output waveforms from the rotary speed sensor RSS1A does not reach 48.

On the other hand, the Duty ratio of the rotary speed sensor RSS1 of the embodiment ranges from ±2% to ±10%. And, even when the crystal gap is 3.8 mm, the Duty ratio of the rotary speed sensor RSS1 is within this range. In other words, even when the crystal gap is larger than 2.3 mm so as not to provide the output of the rotary speed sensor RSS1A of the comparative example, the output of the rotary speed sensor RSS1 is provided.

Therefore, the rotary speed sensor RSS1 of the embodiment can provide the output while suppressing the variation degree of the output even when the range of its air gap G1 is made larger than that of the rotary speed sensor RSS1A of the comparative example by the expansion of the crystal gap. In other words, in the rotary speed sensor RSS1 of the embodiment, the detection accuracy of the magnetic detection elements 21 and 22 can be secured, and besides, the range of the air gap G1 capable of providing the output can be expanded.

According to the above-described embodiment, at least one of the following operations and effects can be provided.

(1) The farther from the bottom surface 20b in the first direction AR1 a part of the edge 31 of the opening 30H of the magnetic panel 30 on the bottom surface 20b side that is the second surface of the sensor component 20 is, the closer to the center axis C1 that is the center of the opening 30H the part is. In this manner, some of the magnetic flux lines formed around the magnet 10 extend to the magnetic detection elements 21 and 22 through the edge 31, and the magnetic flux density near the magnetic detection elements 21 and 22 is large. As a result, even without the reduction in the air gap G1, the detection accuracy of the magnetic detection elements 21 and 22 can be improved. In other words, the range of the air gap G1 capable of providing the output of the rotary speed sensor RSS1 can be expanded together with the securement of the detection accuracy of the magnetic detection elements 21 and 22, and this contributes to the improvement of the easiness of the work for the attachment of the rotary speed sensor RSS1 and the degree of freedom of the design.

(2) The edge 31 is the joint surface between the end portion 31A of the opening portion 30H in the top surface 30t and the connection portion 31B at the position connected to the inner wall 33. The diameter D1 of the end portion 31A is larger than the diameter D2 of the connection portion 31B. Therefore, the edge 31 having the R-shaped cross-sectional surface on the plane in parallel to the Z direction can be formed.

(3) The farther from the bottom surface 20b in the first direction AR1 a part of the outer edge 32 of the magnetic panel 30 on the bottom surface 20b side of the sensor component 20 is, the farther from the center axis C1 that is the center of the opening 30H the part is. In this manner, the magnetic flux density near the magnetic detection elements 21 and 22 is large. Therefore, even without the reduction in the air gap G1, the detection accuracy of the magnetic detection elements 21 and 22 can be improved. Therefore, the range of the air gap G1 capable of providing the output of the rotary speed sensor RSS1 can be expanded together with the securement of the detection accuracy of the magnetic detection elements 21 and 22, and this contributes to the improvement of the easiness of the work for the attachment of the rotary speed sensor RSS1 and the degree of freedom of the design.

Various embodiments and modification examples have been described above. However, the present invention is not limited to these contents. Other conceivable aspects within the scope of the technical idea of the present invention are also included in the scope of the present invention.

In the embodiment, each of the edge 31 and the outer edge 32 has the R-shaped cross-sectional surface on the plane in parallel to the Z direction. However, the present invention is not limited to this example. It is only necessary that at least the edge 31 of the opening 30H has the R-shaped cross-sectional surface on the plane in parallel to the Z direction. In other words, it is only necessary that the farther from the bottom surface 20b of the sensor component 20 a part of the edge 31 is, the closer to the center axis C1 the part is. This manner provides the same operation and effect as at least either one of the operations and effects (1) and (2) provided by the embodiment.

And, the magnetic panel 30 may be formed by not the press molding but forging or others. In this case, a mold is manufactured to have a shape in which the farther from the bottom surface 20b of the sensor component 20 a part of at least the edge 31 among the edge 31 and the outer edge 32 of the magnet panel 30 is, the closer to the center axis C1 the part is. This manner provides the same operation and effect as at least either one of the operations and effects (1), (2) and (3) provided by the embodiment.

What is claimed is:

1. A rotary speed sensor comprising:

a sensor component including a first surface, a second surface opposite to the first surface, a first magnetic detection element arranged between the first surface and the second surface, and a second magnetic detection element arranged between the first surface and the second surface to separate from the first magnetic detection element;

a magnet on the second surface side of the sensor component; and a magnetic panel arranged between the second surface of the sensor component and the magnet, wherein an opening penetrating in a first direction that is an arrangement direction of the sensor component, the magnetic panel and the magnet is formed in the magnetic panel, a wall surface of the opening includes:

an inner wall having a constant diameter; and an edge being closer to the sensor component than the inner wall and having a variable diameter, and the farther from the second surface in the first direction a part of the edge is, the closer to a center of the opening the part is.

2. The rotary speed sensor according to claim 1, wherein the edge is a joint surface between an end portion of the opening portion in a surface facing the sensor component and a connection portion connecting the edge and the inner wall, and a diameter of the end portion of the opening is larger than a diameter of the connection portion.

3. The rotary speed sensor according to claim 1, wherein the farther from the second surface in the first direction a part of an outer edge of the magnetic panel on the second surface side is, the farther from center of the opening the part is.

* * * * *